United States Patent
Kalinoski et al.

[11] Patent Number: 6,058,785
[45] Date of Patent: May 9, 2000

[54] NOISE REDUCTION IN A MASS FLOW MEASURING SYSTEM

[75] Inventors: Richard W. Kalinoski, Little Compton, R.I.; Warren E. Cook, Plymouth, Mass.

[73] Assignee: Foxboro Company, Foxboro, Mass.

[21] Appl. No.: 09/149,794

[22] Filed: Sep. 8, 1998

Related U.S. Application Data

[62] Division of application No. 08/785,748, Jan. 17, 1997, Pat. No. 5,804,740.

[51] Int. Cl.[7] .............................. G01F 1/32; G01R 27/26
[52] U.S. Cl. ..................................... 73/861.24; 73/861.22; 324/684
[58] Field of Search ........................... 73/861.22, 861.24; 324/684, 681, 674

[56] References Cited

U.S. PATENT DOCUMENTS

| | | | |
|---|---|---|---|
| 1,935,445 | 11/1933 | Heinz | 73/861.24 |
| 3,759,097 | 9/1973 | Cushing | 73/194 EM |
| 3,898,881 | 8/1975 | Darby, Jr. | 73/181 |
| 3,927,566 | 12/1975 | Zanker | 73/861.24 |
| 4,169,376 | 10/1979 | Herzl | 73/194 |
| 4,362,061 | 12/1982 | Yokogawa et al. | 73/861.24 |
| 4,437,350 | 3/1984 | Tamura et al. | 73/861.24 |
| 4,448,081 | 5/1984 | Kolitsch et al. | 73/861.03 |
| 4,526,040 | 7/1985 | Matsubara | 73/861.24 |
| 4,627,295 | 12/1986 | Matsubara et al. | 73/861.24 |
| 4,651,572 | 3/1987 | Albertz et al. | 73/861.63 |
| 4,716,770 | 1/1988 | Herzog | 73/861.24 |
| 4,807,481 | 2/1989 | Lew | 73/861.24 |
| 4,941,361 | 7/1990 | Lew | 73/861.24 |
| 4,973,062 | 11/1990 | Lew | 73/861.24 |
| 4,979,156 | 12/1990 | Lew | 73/861.24 |
| 5,186,056 | 2/1993 | Lew | 73/861.24 |
| 5,214,965 | 6/1993 | Lew | 73/861.24 |
| 5,237,877 | 8/1993 | Lew | 73/861.24 |

FOREIGN PATENT DOCUMENTS 2 068 551  8/1981  United Kingdom ............. G01P 5/01

*Primary Examiner*—Harshad Patel
*Attorney, Agent, or Firm*—Fish & Richardson P.C.

[57] ABSTRACT

A method of reducing noise in a mass flow measuring system includes equalizing the ratio of stiffness to mass of a sleeve located in a flow path to the ratio of stiffness to mass of a rod located within the sleeve. The method further includes recognizing a frequency signal from two capacitive sensors mounted to sense axial deflection of the sleeve relative to the rod. The frequency signal is twice the frequency signial from two capacitive sensors mounted to sense lateral deflection of the sleeve relative to the rod. An output of the capacitive sensors for sensing lateral deflection is connected to a conductance circuit and an output of two additional capacitive sensors mounted to sense lateral deflection is connected to the another conductance circuit. The method includes adjusting an output of one of the conductance circuits such that the sum of the outputs is zero.

2 Claims, 6 Drawing Sheets

NOISE REDUCTION IN A MASS FLOW MEASURING SYSTEM

This application is a division of Ser. No. 08/785,748 filed Jan. 17, 1997, now U.S. Pat. No. 5,804,740.

BACKGROUND OF THE INVENTION

This invention relates to a device and method for measuring mass flow.

To compute mass flow both the flow velocity and fluid density must be known. It is known how to use a vortex flowmeter to measure a shedding frequency proportional to the flow velocity ($f_1 = k_1 V$), and to measure the average drag force ($A_1$) on an object in a flowstream which is proportional to the fluid density ($\rho$) and the flow velocity squared ($A_1 = c_1 \rho V^2$). The two measurements can be used to compute mass flow rate.

SUMMARY OF THE INVENTION

According to the invention, a vortex mass flowmeter for providing the mass flow of a fluid includes a body for placement in a flow path of the fluid and four capacitive sensors. The body includes a sleeve exposed to the flow and defining an interior chamber with a rod positioned within the chamber. At least a portion of the sleeve is movable in an axial direction of the flow. The first and second capacitive sensors are mounted to sense lateral deflection of the sleeve relative to the rod thereby providing a first frequency signal related to shedding. The third and fourth capacitive sensors are mounted to sense axial deflection of the sleeve relative to the rod thereby providing a second frequency signal related to drag. The first frequency signal is dependent on the flow velocity, and the second frequency signal is dependent on the flow velocity and the fluid density.

Embodiments of the invention may include one or more of the following features.

Coupled to the capacitive sensors is a frequency discriminator which only recognizes a second frequency signal having a frequency component that is twice the first frequency signal.

The sleeve has a first ratio of stiffness to mass and the rod has second ratio of stiffness to mass equal to the first ratio.

Fifth and sixth capacitive sensors are mounted to sense lateral deflection of the sleeve relative to the rod thereby providing a third frequency signal related to shedding. An output of the first and second capacitive sensors is connected to a first conductance circuit and an output of the fifth and sixth capacitive sensors is connected to a second conductance circuit. The output of one of the first and second conductance circuits is adjustable, such that when an output of the first conductance circuit and an output of the second conductance circuit are added the sum is equal to zero.

Seventh and eighth capacitive sensors are mounted to sense axial deflection of the sleeve relative to the rod thereby providing a fourth frequency signal related to drag. An output of the third and fourth capacitive sensors is connected to a third conductance circuit and an output of the seventh and eighth capacitive sensors is connected to a fourth conductance circuit. The output of one of the third and fourth conductance circuits is adjustable, such that when an output of the third conductance circuit and an output of the fourth conductance circuit are added the sum is equal to zero.

According to another aspect of the invention, a method of measuring mass flow of a fluid includes positioning a body in a flow path of the fluid, the body including a sleeve exposed to the flow defining an interior chamber and a rod positioned within the chamber, at least a portion of the sleeve being movable in an axial direction of the flow; arranging first and second capacitors on the rod such that capacitance of the capacitors varies as the sleeve moves laterally relative to the rod; determining a first frequency signal related to shedding from the first and second capacitors, the first frequency signal being dependent on the flow velocity; arranging third and fourth capacitors on the rod such that capacitance of the capacitors varies as the sleeve moves relative to the rod in an axial flow direction; determining a second frequency signal related to drag from the third and fourth capacitors, the second frequency signal being dependent on the flow velocity and the fluid density; and determining mass flow rate from the first and second frequency signals.

According to another aspect of the invention, a method of reducing noise in a mass flow measuring system includes equalizing a first ratio of stiffness to mass of a sleeve located in a flow path of a fluid for movement as a result of the flow to a second ratio of stiffness to mass of a rod located within an interior chamber of the sleeve; recognizing a second frequency signal from third and fourth capacitive sensors mounted to sense axial deflection of the sleeve relative to the rod that has a frequency component that is twice a first frequency signal from first and second capacitive sensors mounted to sense lateral deflection of the sleeve relative to the rod; and adjusting an output of one of a first conductance circuit and a second conductance circuit such that when an output of the first conductance circuit and an output of the second conductance circuit are added the sum is equal to zero. An output of the first and second capacitive sensors is connected to the first conductance circuit and an output of a fifth capacitive sensor and a sixth capacitive sensor is connected to the second conductance circuit. The fifth and sixth capacitive sensors are mounted to sense lateral deflection of the sleeve relative to the rod.

In particular embodiments of the invention, an output of one of a third conductance circuit and a fourth conductance circuit is adjusted such that when an output of the third conductance circuit and an output of the fourth conductance circuit are added the sum is equal to zero. An output of the third and fourth capacitive sensors is connected to the third conductance circuit and an output of a seventh capacitive sensor and an eighth capacitive sensor is connected to the fourth conductance circuit. The seventh and eighth capacitive sensors are mounted to sense axial deflection of the sleeve relative to the rod.

Advantages of using capacitive sensors in a vortex mass flow meters include that the capacitive sensors are quite linear for the small deflections involved and air gap capacitors can be employed which have stable operation over a wide temperature range. Capacitive sensors can measure frequency as well as absolute position. When the capacitive sensors are used in pairs in a differential conductance circuit, they can be ratioed, and are therefore insensitive to absolute capacitance, and they can be automatically recalibrated periodically using on board reference capacitors. Since lift and drag can both be measured using capacitive sensors, some electronics can be shared between the sets of capacitors. If the shedder has a different thermal expansion coefficient than the sensor rod, all the capacitors will either increase or decrease simultaneously. Therefore the sum of the capacitances of any opposing pair of capacitors can be used as a temperature sensor.

DESCRIPTION OF THE PREFERRED EMBODIMENT

Figure 1:
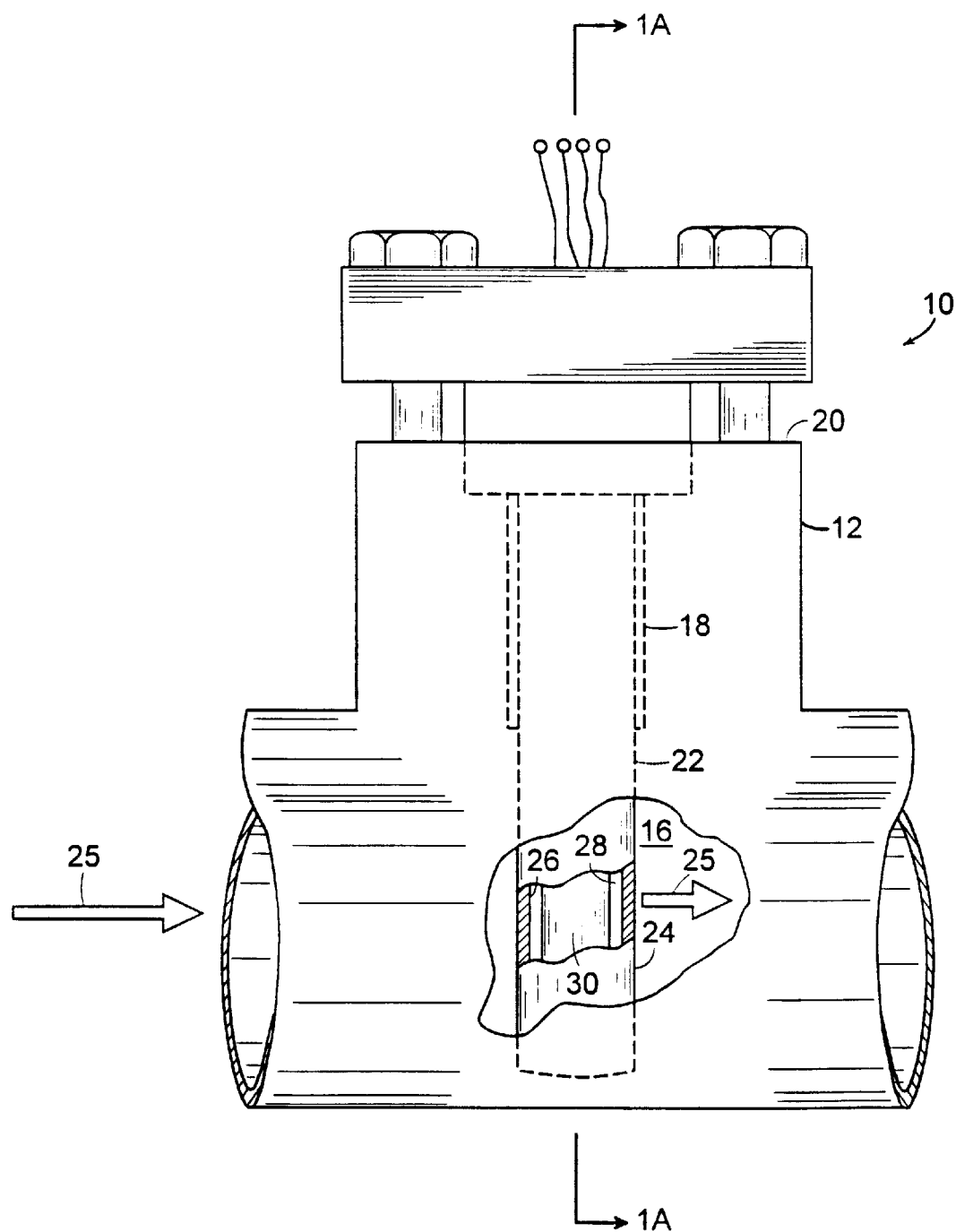
FIG. 1 is a side view of a vortex mass flow meter, according to the invention, with portions broken away to show a shedder sleeve.
Figure 1A:
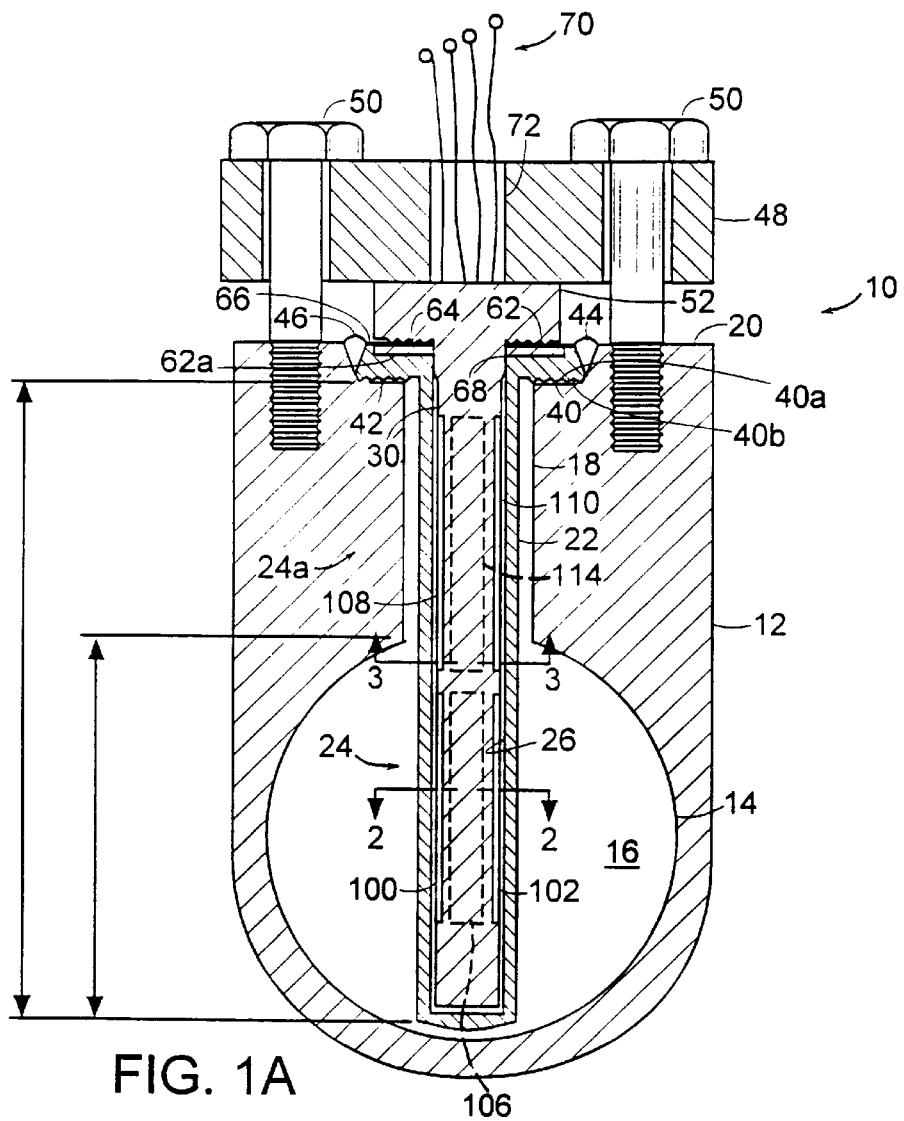
FIG. 1A is a cross-sectional view of the vortex mass flow meter, taken along lines 1A—1A of FIG. 1.

Referring to FIGS. 1 and 1A, a vortex mass flow meter 10 for measuring mass flow of a fluid includes a flow meter body 12 with an inner wall 14 defining a fluid flow channel 16. An access passage 18 extends transversely from a surface 20 of flow meter body 12 to fluid flow channel 16. A shedder sleeve 22 extends through access passage 18 into channel 16 such that a lower section 24 of shedder sleeve 22 spans the fluid flow path (arrows 25), as shown. An internal wall 26 of shedder sleeve 22 defines a chamber 28; a sensor rod 30 is positioned within chamber 28.

Figure 2:
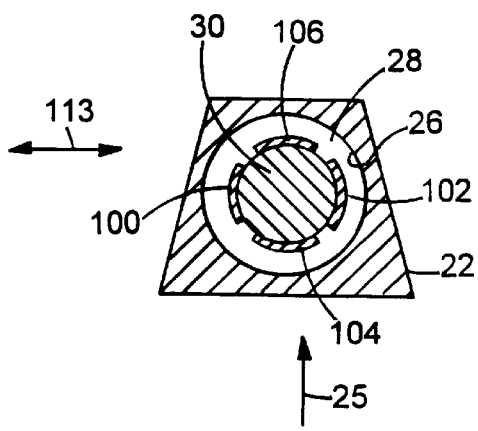
FIG. 2 is a cross-sectional view of the shedder sleeve and a sensor rod of the vortex mass flow meter, taken along lines 2—2 of FIG. 1A.
Figure 3:
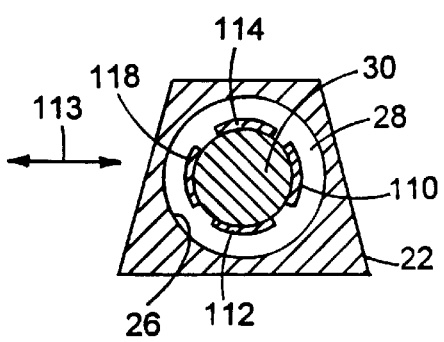
FIG. 3 is an additional cross-sectional view of the shedder sleeve and sensor rod of the vortex mass flow meter, taken along lines 3—3 of FIG. 1A.

Referring also to FIGS. 2 and 3, mounted to sensor rod 30 are capacitive sensors, e.g., air gap capacitive sensors 100, 102, 104, 106, 108, 110, 112 and 114. The capacitive sensors are electrically insulated from each other with one electrode of each sensor being plated on sensor rod 30 and the second electrode of each sensor being a common electrode formed by shedder sleeve 22. Sensor rod 30 is preferably formed from a ceramic material and shedder sleeve 22 is preferably formed from a metal.

Referring again to FIG. 1A, to assemble vortex mass flow meter 10, shedder sleeve 22 is placed within passage 18 with a flange 40 of shedder sleeve 22 located within a recess 42 of flow meter body 12. Flange 40 is welded along its periphery 44 to flow meter body 12. Flange 40 and the weld joint are both strong enough to contain the process pressure. Sensor rod 30 is then placed within chamber 28 of the shedder sleeve 22 and bonnet 48, in conjunction with bolts 50, clamps sensor rod 30 to flow meter body 12. Bonnet 48 and bolts 50 are strong enough to contain the process fluid pressure should a leak develop in shedder sleeve 22. Sensor rod 30 includes a coaxial head 52 having serrations 62 on a bottom surface 64. Sensor rod 30 also includes a coaxial section 68 below head 52 of increased diameter which forms a close fit with channel 26 to position the active portion of sensor rod 30 centrally in channel 26. Either a soft metal or an elastomeric gasket 62a is placed between serrations 62 and upper surface 66 of shedder sleeve flange 40. In the event of a mechanical failure of shedder sleeve 22, gasket 62a provides a secondary process seal and bonnet 48 and bolts 50 are strong enough to contain the process pressure. Wires 70 which run to the capacitive sensors extend through an opening 72 in mounting bracket 48. Sensor rod 30 is field replaceable even with fluid in the flow pipe (not shown).

Shedder sleeve 22 can also be designed to be removable if desired. By including serrated teeth 40a in flange 40 and either a soft metal gasket or a elastomeric gasket 40b to seal the process fluid, both the shedder sleeve and the sensor rod can be replaced in the field if damaged providing the pipe is empty.

In order to compute the mass flow of a fluid flowing in channel 16, the flow velocity and fluid density must be determined. Signals from the capacitive sensors provided the information needed to compute flow velocity and fluid density and can also be used to reduce the effects of vibration on the measurements of lift force and drag force signals.

Sensors 100, 102, 108 and 110 sense later deflection (arrow 113) of shedder sleeve 22 relative to sensor rod 30 due to an alternating lift force imparted to shedder sleeve 22 by vortices generated by fluid flow along flow path 25. Sensors 100, 102 sense deflection of lower section 24 of shedder sleeve 22, and sensors 108, 110 sense deflection of an upper section 24a of shedder sleeve 22. The deflection of upper section 24a is caused by the generated vortices acting over lower section 24.

Sensors 104, 106, 112 and 114 sense axial deflection (along flow direction 25) of shedder sleeve 22 relative to sensor rod 30 due to drag forces imparted to shedder sleeve 22. Sensors 104, 106 sense deflection of lower section 24 of shedder sleeve 22, and sensors 112, 114 sense deflection of upper section 24a of shedder sleeve 22. The deflection of upper section 24a is caused by the drag forces acting over lower section 24.

Figure 4:
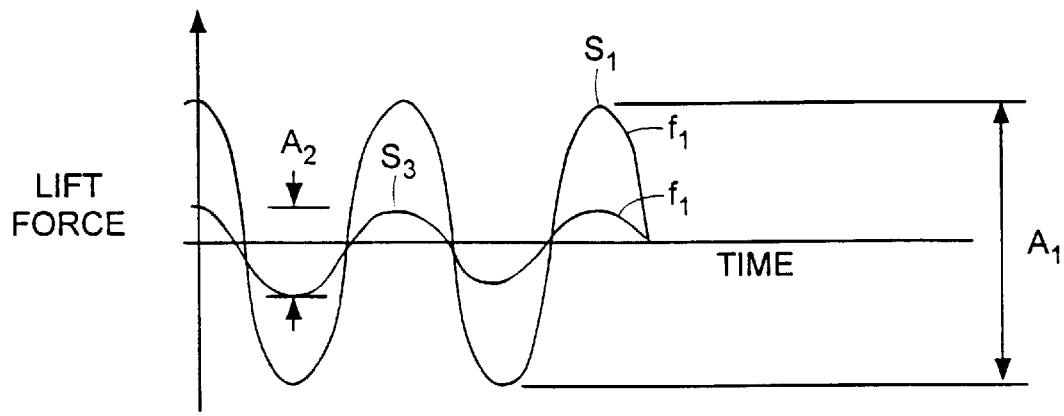
FIG. 4 is a frequency diagram of a lift force signal generated by the vortex mass flow meter of FIG. 1.

Referring to FIG. 4, a sinusoidal signal, whose frequency, $f_1$, is equal to the frequency of the alternating lift force and deflection of shedder sleeve 22 created by the shedding vortices, is generated at both sensor pairs 100, 102 and 108, 110. The frequency signal, $f_1$, from sensors 100, 102, 108 and 110 is proportional to the flow velocity ($f_1=k_1V$). The amplitude, $A_1$, of the signal from sensors 100, 102 is proportional to the fluid density times the flow velocity squared ($A_1=C_1\rho V^2$). The amplitude, $A_2$, of the signal from sensors 108, 110 is also proportional to the fluid density times the flow velocity squared ($A_2=C_2\rho V^2$).

Figure 5:
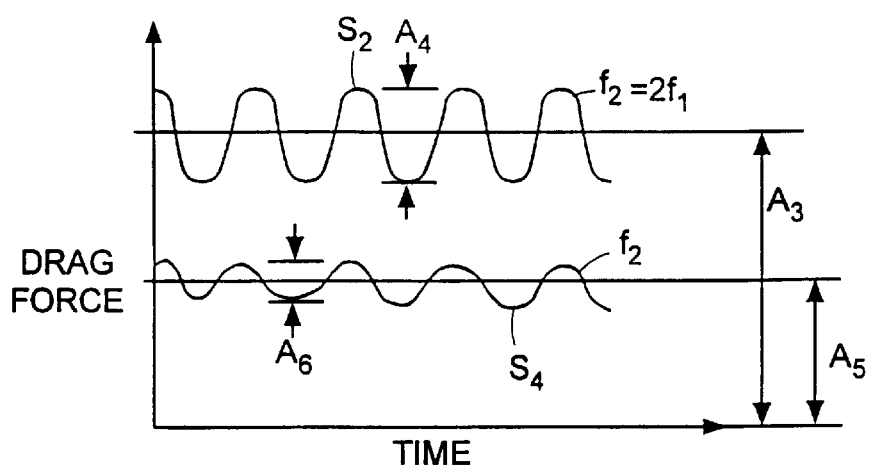
FIG. 5 is a frequency diagram of a drag force signal generated by the vortex mass flow meter of FIG. 1.

Referring to FIG. 5, the signals at sensor pairs 104, 106 and 112, 114 have two components. One is a relatively steady, d.c., drag force, and superimposed on this is an alternating, a.c., drag force having a frequency, $f_2$, twice the vortex shedding frequency, $f_2=2f_1$. The d.c. component is the result of the pressure drop created across shedder sleeve 22 in flow direction 25 by the flowing fluid. The pressure drop and therefore the drag force and deflection of shedder sleeve 22 is proportional to the fluid density times flow velocity squared. Therefore, the amplitudes $A_3$, $A_5$ of the d.c. component of the signals at sensor pairs 104, 106 and 112, 114, respectively, is proportional to the fluid density times flow velocity squared ($A_3=C_3\rho V^2$ and $A_5=C_5\rho V^2$).

The a.c. component is the result of an alternating pressure fluctuation which simultaneously occurs in the axial direction across shedder sleeve 22 along with the pressure fluctuation which occurs laterally across shedder sleeve 22 as a result of vortex shedding. The axial fluctuation goes through one full cycle for each vortex which is shed therefore frequency doubling occurs. The amplitudes $A_4$, $A_6$ of the a.c. component of the signals at sensor pairs 104, 106 and 112, 114, respectively, is also proportional to the fluid density times flow velocity squared ($A_4=C_4\rho V^2$ and $A_6=C_6\rho V^2$).

The mass flow rate is preferably determined from a combination of the alternating lift force measured at sensor pair 100, 102 and the d.c. drag force on shedder sleeve 22 measured at sensor pair 104, 106. The flow velocity is determined from shedding frequency $f_1$ ($f_1=k_1V$) measured at sensor pair 100, 102. The density is then determined from the amplitude $A_3$ ($A_3=C_3\rho V^2$) measured at sensor pair 104, 106. The amplitude $A_4$ of the a.c. component of the drag force can also be used in combination with frequency $f_1$ to determine density.

The mass flow can also be computed solely from the frequency $f_1$ and amplitude $A_1$ of the fluctuating lift force as measured at sensor pair 100, 102. The fluid velocity is determined by measuring the shedding frequency signal $f_1$. The density is computed by dividing the amplitude $A_1$ by the velocity squared which is determined from frequency $f_1$.

Using the amplitude of the d.c. drag force rather than the amplitude of the alternating lift force to determine density is preferred because the alternating lift force in general has a very unsteady amplitude because of modulation in the intensity of vortex shedding caused by flow turbulence. The d.c. drag force on the shedder is more constant because it is a function of flow velocity and not of vortex shedding. Therefore a more accurate computation of density can be achieved.

In a third method, the mass flow rate can be determined solely from the drag forces on the shedder measured by sensor pair 104, 106. The flow velocity is determined from the frequency $f_2=2f_1=2k_1V$. The density can be determined using the amplitude $A_3$ of the d.c. drag force component or the amplitude $A_4$ of the a.c. component of the drag force.

Vibration effects can produce noisy signals at all of the sensor pairs. Described below are three methods for minimizing vibration effects; these methods can be used alone or in any combination.

Method 1

Shedder sleeve 22 can be designed to deflect with nearly the same amplitude and in phase with sensor rod 30 as a result of a vibration input either in the flow direction or the lateral direction. This can be achieved by matching the ratio of the mass of shedder sleeve 22 to its spring rate to the ratio of the mass of sensor rod 30 to its spring rate. Additionally, the resonant frequency of both shedder sleeve 22 and sensor rod 30 must be substantially higher than the maximum expected shedding frequency. Since both shedder sleeve 22 and sensor rod 30 vibrate with the same amplitude and phase, no capacitance changes due to external vibration influences are sensed. For this method to provide perfect vibration rejection, the motion of shedder sleeve 22 and sensor rod 30 must be identical in all directions and respond identically to all sources of external vibration. Since this is difficult, complete vibration rejection by this method alone is only partially effective.

Method 2

An additional method of rejecting unwanted vibration effects takes advantage of the fact that the alternating lift force due to vortex shedding occurs at the vortex shedding frequency, $f_1$, and that the fluctuating drag force, $f_2$, occurs at twice $f_1$.

Electronic signal processing can be employed which only recognizes a signal as a flow signal if it occurs at the shedding frequency, $f_1$, as determined by sensors 100, 102, and at the alternating frequency, $f_2=2f_1$, as determined by sensors 104, 106. This results in unwanted pump pulsation and vibration signals being rejected because frequency doubling does not occur due to these influences. Additionally, there is a fixed phase relationship (i.e. $\Delta\phi$ is constant) between the two frequency signal, $f_1$ and $f_2$, to further aid in identifying the desired signals.

Method 3

A third method of rejecting unwanted vibration effects employs the additional sensors 108, 110 and 112, 114 which sense motion of upper section 24a of shedder sleeve 22 (see FIGS. 1A and 3). By placing sensor pairs 108, 110 and 112, 114 at a different lever arm ratio than sensor pairs 100, 102, and 104, 106, vibrations can be tuned out. Vibration effects cause a signal amplitude, $V_1$, to be generated by sensors 100, 102, a signal amplitude, $V_2$, to be generated by sensors 108, 110, a signal amplitude, $V_3$, to be generated by sensors 104, 106, and a signal amplitude, $V_4$, to be generated by sensors 112, 114.

The force distribution on shedder sleeve 22 due to vortex shedding is different from the force distribution due to mechanical vibration since vibration forces act over the whole length of shedder sleeve 22 while vortex shedding forces act only over the portion of shedder sleeve 22 which is in the flow stream, i.e., lower section 24. Therefore, the ratio of the amplitudes of the vortex shedding signals, $A_1/A_2$, is different than the ratio of the amplitudes of the vibration signals, $V_1/V_2$. Also, the ratio of the amplitudes of the drag force signals, $A_4/A_6$ and $A_3/A_5$, is different than the ratio of the amplitudes of the vibration signals, $V_3/V_4$. This relationship can be used to cancel out vibration effects, described further below.

Figure 6:
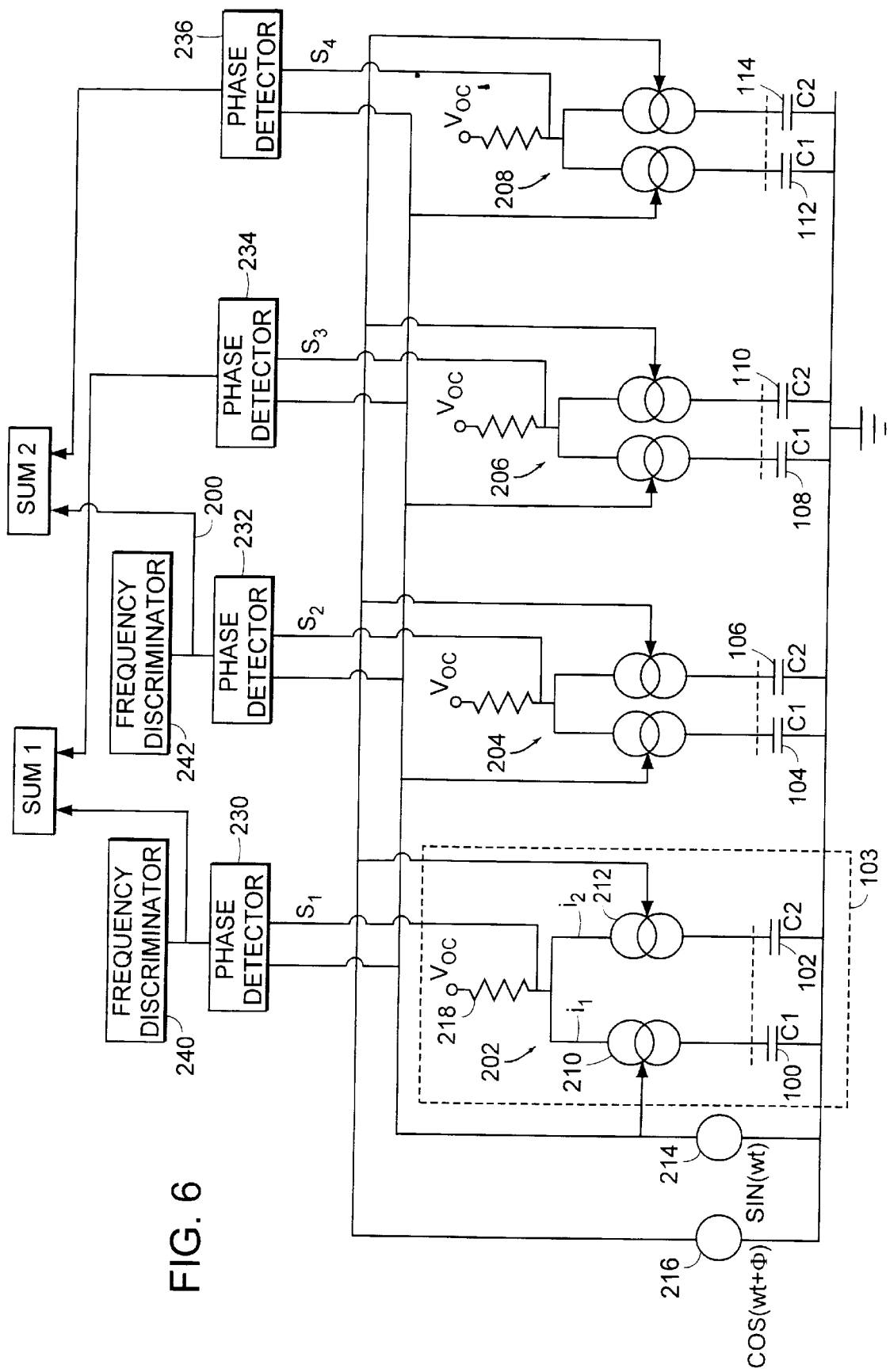
FIG. 6 is a schematic of electrical circuitry associated with the vortex mass flow meter of FIG. 1.

Referring to FIG. 6, electronic circuitry 200 includes sensor assemblies 202, 204, 206 and 208 for providing signals $S_1, S_2, S_3$ and $S_4$, respectively. Signal $S_1$ includes the shedding signal of amplitude $A_1$ and frequency $f_1$ and the vibration signal $V_1$. Signal $S_3$ includes the shedding signal of amplitude $A_2$ and frequency $f_1$ and the vibration signal $V_2$. Signal $S_2$ includes the drag signal with d.c. component of amplitude $A_3$, a.c. component of frequency $2f_1$ and amplitude $A_4$, and the vibration signal $V_3$. Signal $S_4$ includes the drag signal with d.c. component of amplitude $A_5$, a.c. component of frequency $2f_1$ and amplitude $A_6$, and the vibration signal $V_4$.

Referring to sensor assembly 202, sensor assemblies 204, 206, 208 being identical, two current sources 210, 212 are formed by monitoring the current generated when the two capacitive sensors 100, 102 are driven by signals 214, 216, respectively, of the same frequency and amplitude but separated in phase by a value of, for example 192.25 degrees. The resulting currents $i_1, i_2$ are a function of the value of the associated capacitive sensors 100, 102. The capacitance values of the eight capacitors vary with the size of the flowmeter from approximately 25 picofarads to 250 picofarads. At zero deflection of shedder sleeve 22, opposing capacitors, e.g., capacitors 100, 102, have the same nominal capacitance value.

The alternating deflection of shedder sleeve 22 causes a capacitance change at each sensor. Sensors which are opposite each other, e.g., sensors 100 and 102, are connected to a differential conductance circuit 103. A deflection of shedder sleeve 22 causes the air gap for one sensor to increase while the gap of the opposite sensor simultaneously decreases. Thus one capacitance increases while the other simultaneously decreases causing an imbalance in the differential conductance circuit 103.

When summed by a common resistor 218, the output (signal $S_1$) has a phase which is a function of the difference in capacitance (caused by a lateral deflection of shedder sleeve 22) between capacitive sensors 100, 102:

$$I=Q/t=B(\sin(wt))+A(\cos(wt+\phi))$$

For $\phi$ equal to 12.25°

$$I=(B-0.976A)\sin(wt)-A(0.216)\cos(wt)$$

For A and B nearly equal, the amplitude is nearly 0.216 and the phase is approximately 90°. If an XOR style phase detector 230 is used, a 1% difference in capacitance results in a 3.3% change in phase detector output. The differential sensing helps eliminate errors, e.g. thermal errors.

Phase detector 230 is modulated by signal $S_1$ at fundamental vortex shedding frequency $f_1$ and by noise $V_1$. Phase detector 232 is modulated by signal $S_2$ at frequency $f_2$, twice the fundamental frequency $f_1$, and by noise $V_2$. Phase detector 234 is modulated by signal $S_3$ at frequency $f_1$ and by noise $V_3$. Phase detector 236 is modulated by signal $S_4$ at frequency $f_2$, twice the fundamental frequency $f_1$, and by noise $V_4$.

To implement vibration cancelling method 3, sensor assemblies 202, 206 are connected to a summation circuit, with one of the input gains being adjustable. The electronics are tuned such that the vibration signals cancel, i.e., $V_1+k_1V_2=0$. The connections to sensors 100, 102, 108, 110 are made such that the signals $S_1$ and $S_2$ are out of phase.

Since the ratio of the lateral vibration signals is not the same as for the vortex shedding signals, a net shedding signal $A_1+k_1A_2$ at shedding frequency $f_1$ remains whose amplitude is proportional to fluid density times velocity squared.

Similarly, sensors 204, 208, are connected to a summation circuit, with one of the input gains being adjustable. The electronics are tuned to cancel the vibration signals such that $V_3+k_2V_4=0$. The connections to sensors 104, 106, 112, 114 are made such that the signals $S_3$ and $S_4$ are out of phase.

Since the ratio of the axial vibration signals is not the same as for the drag signals, a net drag signal remains whose a.c. component has a frequency $2f_1$ and an amplitude $A_4+k_2A_6$ and whose d.c. component has an amplitude of $A_3+k_2A_5$, both amplitudes being proportional to density times velocity squared.

Common mode static pressure noise has negligible effect on the accuracy of the mass flow measurement because shedder sleeve 22 does not deflect either laterally or axially due to static pressure changes. Additionally, compression of the hollow shedder sleeve would cause all the capacitive sensor values to increase negligibly.

Figure 7:
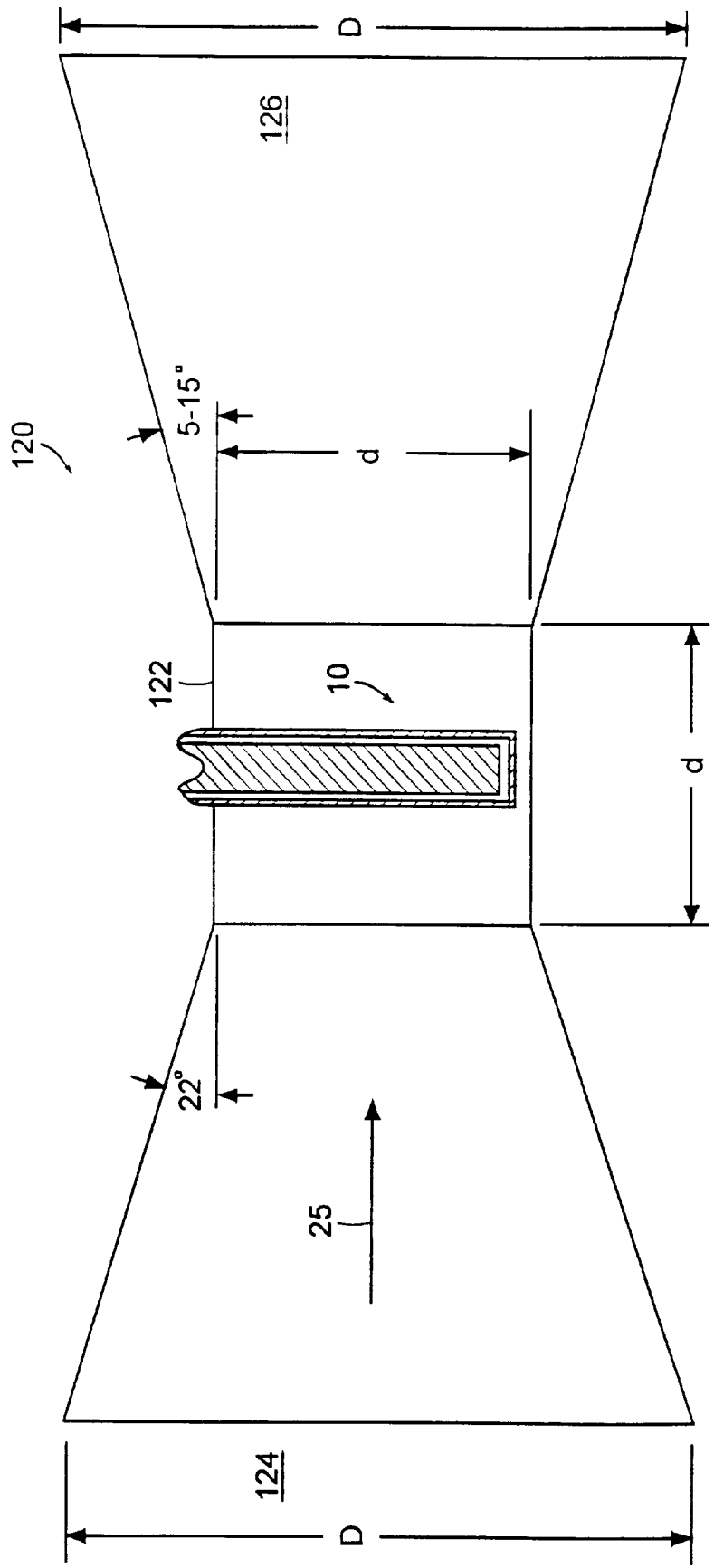
FIG. 7 is a diagrammatic representation of a venturi section of the vortex mass flow meter of FIG. 1.

Referring to FIG. 7, a venturi section 120 can be used to increase the accuracy of the mass flow computation, particularly under low flow conditions. Venturi section 120 conditions the flow creating a uniform flow profile in the measuring section 122 regardless of upstream piping conditions such as misalignment or pipe schedule. Vortex shedding becomes more stable and reduces dropout, and the amplitude of the lift force created by shedding becomes more stable. This in turn makes both the drag coefficient and the alternating lift force more predictable and the mass flow computation more accurate.

Venturi section 120 also speeds up the flow to increase signal amplitude and improve measurement capability at very low flows. A diameter reduction of, for example, 2:1, from D to D/2, increases the flow velocity in the measuring section 122 by 4:1. Since the lift force is proportional to flow velocity squared, the lift force is increased by a factor of 16. This in turn allows for the measurement of correspondingly lower flow rates. The inlet 124 of venturi section 120 preferably narrows to measuring section 122 by an angle of 22°, and measuring section 122 preferably widens to outlet 126 of venturi section 120 by an angle in range of 5–15°.

Vortex mass flow meter 10 can be used with both liquids and gases over a wide flow range of approximately 0.5 to 25 ft/sec for liquids and approximately 20 to 600 ft/sec for gases, and a wide temperature range from cryogenic temperatures of −326° F. to 800° F.

Figure 8:
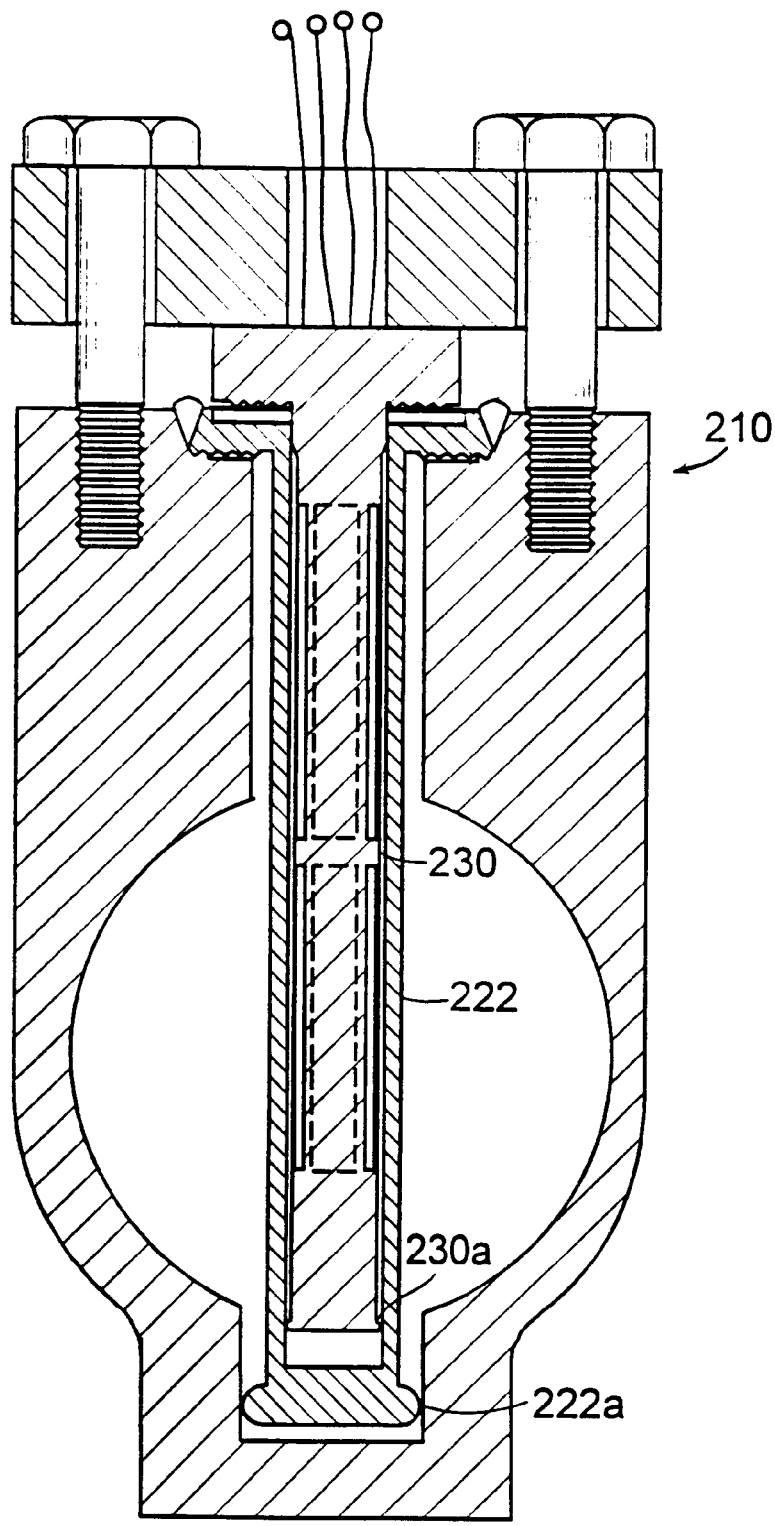
FIG. 8 is a cross-sectional view, like the view of FIG. 1A, of an alternative embodiment of a vortex mass flow meter.

Other embodiments are within the scope of the following claims. For example, referring to FIG. 8, a vortex mass meter 210 has both a shedder sleeve 222 and a sensor rod 230 supported at their lower ends 222a, 230a, respectively. This generally has the beneficial result of a higher resonant frequency for both shedder sleeve 222 and sensor rod 230, but at the expense of considerably smaller deflection of shedder sleeve 222 and therefore smaller signals.

What is claimed is:

1. A method of reducing noise in a mass flow measuring system, comprising:

equalizing a first ratio of stiffness to mass of a sleeve located in a flow path of a fluid for movement as a result of the flow to a second ratio of stiffness to mass of a rod located within an interior chamber of said sleeve, recognizing a second frequency signal from third and fourth capacitive sensors mounted to sense axial deflection of said sleeve relative to said rod that has a frequency component that is twice a first frequency signal from first and second capacitive sensors mounted to sense lateral deflection of said sleeve relative to said rod, and adjusting an output of one of a first conductance circuit and a second conductance circuit such that when an output of said first conductance circuit and an output of said second conductance circuit are added the sum is equal to zero, a first output of said first and second capacitive sensors being connected to said first conductance circuit and a second output of a fifth capacitive sensor and a sixth capacitive sensor being connected to said second conductance circuit, said fifth and sixth capacitive sensors being mounted to sense lateral deflection of said sleeve relative to said rod.

2. The method of claim 1 further comprising adjusting an output of one of a third conductance circuit and a fourth conductance circuit such that when an output of said third conductance circuit and an output of said fourth conductance circuit are added the sum is equal to zero, a third output of said third and fourth capacitive sensors being connected to said third conductance circuit and a fourth output of a seventh capacitive sensor and an eighth capacitive sensor being connected to said fourth conductance circuit, said seventh and eighth capacitive sensors being mounted to sense axial deflection of said sleeve relative to said rod.

* * * * *